US009542350B1

(12) United States Patent
Kissell et al.

(10) Patent No.: US 9,542,350 B1
(45) Date of Patent: Jan. 10, 2017

(54) AUTHENTICATING SHARED INTERCONNECT FABRICS (71) Applicant: Google Inc., Mountain View, CA (US)

(72) Inventors: Kevin D. Kissell, Menlo Park, CA (US); Benjamin Charles Serebrin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 441 days.

(21) Appl. No.: 13/860,857

(22) Filed: Apr. 11, 2013

Related U.S. Application Data (60) Provisional application No. 61/623,888, filed on Apr. 13, 2012.

(51) Int. Cl.
G06F 13/14 (2006.01)
G06F 13/40 (2006.01)

(52) U.S. Cl.
CPC ........... G06F 13/4068 (2013.01); G06F 13/14 (2013.01)

(58) Field of Classification Search
USPC ... 710/9, 10, 26, 28, 36, 107, 305, 306, 313
See application file for complete search history.

(56) References Cited

U.S. PATENT DOCUMENTS

| 7,426,718 | B2 | 9/2008 | Hatlelid et al. | |
|---|---|---|---|---|
| 7,610,431 | B1* | 10/2009 | Watkins et al. | 710/312 |
| 7,752,346 | B2* | 7/2010 | Talayco et al. | 710/9 |
| 7,752,360 | B2* | 7/2010 | Galles | 710/316 |
| 8,041,871 | B2* | 10/2011 | Deshpande et al. | 711/108 |
| 8,265,075 | B2 | 9/2012 | Pandey | |
| 8,321,722 | B2 | 11/2012 | Tanaka et al. | |
| 8,359,415 | B2 | 1/2013 | Brown et al. | |
| 8,370,588 | B2 | 2/2013 | Nakajima et al. | |
| 8,429,325 | B1* | 4/2013 | Onufryk et al. | 710/316 |
| 9,146,890 | B1* | 9/2015 | Brown et al. | |
| 2009/0248973 | A1* | 10/2009 | Deshpande et al. | 711/108 |
| 2010/0082874 | A1* | 4/2010 | Baba et al. | 710/316 |
| 2011/0252173 | A1* | 10/2011 | Armstrong et al. | 710/305 |
| 2012/0166690 | A1 | 6/2012 | Regula | |
| 2012/0284448 | A1* | 11/2012 | Ayzenfeld et al. | 710/313 |
| 2013/0160002 | A1* | 6/2013 | Graham et al. | 718/1 |

OTHER PUBLICATIONS

Regula, Jack (2004). "Using Non-transparent Bridging in PCI Express Systems".
"Virtual Function" from Wikipedia, the free encyclopedia. Obtained on Mar. 4, 2013 from http://en.wikipedia.org/wiki/Virtual_function.

* cited by examiner

Primary Examiner — Khanh Dang
(74) Attorney, Agent, or Firm — McDermott Will & Emery LLP (57) ABSTRACT A method of authenticating shared peripheral component interconnect express devices of a switched fabric includes associating at least one requester identifier with a physical function of a device on the switched fabric and instantiating a virtual function of the device based on the physical function. The virtual function includes the associated at least one requester identifier. The method further includes accepting memory-mapped input/output traffic through the virtual function only from a requester having a corresponding requester identifier matching an associated requester identifier of the virtual function. The method may also include allowing a write operation of the virtual function or the physical function only to an address residing within an allowable address range associated with the device.

34 Claims, 8 Drawing Sheets

AUTHENTICATING SHARED INTERCONNECT FABRICS

CROSS REFERENCE TO RELATED APPLICATIONS

This U.S. patent application claims priority under 35 U.S.C. §119(e) to U.S. Provisional Application 61/623,888, filed on Apr. 13, 2012, which is hereby incorporated by reference in its entirety.

TECHNICAL FIELD

This disclosure relates to authenticating shared interconnect fabrics.

BACKGROUND

Peripheral Component Interconnect Express (also referred to as PCI Express or PCIe) is a computer expansion interconnect standard designed to replace the older PCI, PCI-X, and AGP bus standards. PCIe has numerous improvements over the aforementioned bus standards, including higher maximum system throughput, lower I/O pin count and smaller physical footprint, better performance-scaling for devices, a more detailed error detection and reporting mechanism, and native hot-plug functionality. More recent revisions of the PCIe standard support hardware I/O virtualization.

PCIe includes access control services (ACS) that allow peer-to-peer transactions, where traffic between peer endpoints can be managed by a physical switch port, rather than through a root complex. ACS provides a mechanism by which a Peer-to-Peer PCIe transaction can be forced to go up through a PCIe Root Complex, providing a kind of gatekeeper to prevent unauthorized transactions. This scheme breaks down, however, when traffic flows through multiple switches and when a single physical device at a port instantiates multiple devices or "virtual functions" that may need distinct access privileges, for fault containment and security.

SUMMARY

Filtering transactions based on an intrinsically reliable identifier of an originator of a transaction, and not just elements of the switching path taken, improves fault containment and security. One aspect of the disclosure provides a relatively simple, low-overhead mechanism to ensure that devices and virtual functions accept commands only from designated peers. In some implementations, a method of authenticating shared peripheral component interconnect express (e.g., PCI Express) devices of a switched fabric includes associating at least one permitted requester identifier with a physical function of a device on the switched fabric and instantiating a virtual function of the device based on the physical function. The virtual function inherits the associated at least one permitted requester identifier from the physical function. The method further includes accepting memory-mapped input/output traffic through the virtual function only from a requester having a corresponding requester identifier matching a permitted requester identifier associated with the virtual function. The method, in some implementations, includes associating other permitted requester identifier(s) with the virtual function (e.g., storing the other requester identifiers in a register). The other associated requester identifier(s) may be specific to that virtual function.

Implementations of the disclosure may include one or more of the following features. In some implementations, the permitted requester identifier includes a sender identifier of a Peripheral Component Interconnect Express (PCI Express) transport level packet. The method may include defining a physical function register to store the associated at least one permitted requester identifier. Moreover, the method may include defining an authoritative requester identifier field for each instantiated virtual function of the physical function and associating a set of enable bits with each virtual function's authoritative requester identifier field. The set of enable bits may include at least one of a bus matching bit, a device matching bit, a function matching bit, or a filter function enable bit. In some implementations, multiple enable bits per bus, device, or function may be instantiated to form a mask of bus, device, and function bits to be checked against the requester identifier.

The device may ignore the associated at least one permitted requester identifier of the physical function when bus matching is disabled, for example, when the bus matching bit or bits is/are cleared. In some examples, the device responds to memory-mapped input/output request packets having requester identifiers with a bus portion matching a corresponding bus portion of an associated requester identifier of the physical function when the bus matching bit is set. Additionally or alternatively, the device may respond to memory-mapped input/output request packets having requester identifiers with a bus portion and a device portion both matching a corresponding bus portion and a corresponding device portion of a requester identifier associated with the physical function when the bus matching bit and the device matching bit are both set. In some examples, the device responds to memory-mapped input/output request packets having requester identifiers with all bits matching corresponding bits of a requester identifier associated with the physical function when the bus matching bit, the device matching bit, and the function bit are each set.

In some implementations, the method includes instantiating the virtual function with the same set of enable bits as the physical function. The virtual function may be referenced only by a root complex or peer designated by the permitted requester identifier of the physical function (e.g., an identifier programmed into the function for filtering) when the virtual function's bus matching bit is cleared. The virtual function may respond to memory-mapped input/output request packets having requester identifiers with a bus portion matching a corresponding bus portion of an associated requester identifier of the virtual function when the bus matching bit is set. Additionally or alternatively, the virtual function may respond to memory-mapped input/output request packets having requester identifiers with a bus portion and a device portion both matching a corresponding bus portion and a corresponding device portion of an associated requester identifier of the virtual function when the bus matching bit and the device matching bit are both set. In some examples, the virtual function responds to memory-mapped input/output request packets having requester identifiers with all bits matching corresponding bits of an associated requester identifier of the virtual function when the bus matching bit, the device matching bit, and the function bit are each set.

The method may include allowing a write operation of the virtual function or the physical function only to an address residing within an allowable address range associated with the device. In some examples, the method includes associating one or more allowable address ranges of the device to each virtual function. The method may also include associating an address base and an address length for the one or more allowable address ranges. In some examples, the method includes associating an address limit, such as an address length or a maximum address.

Another aspect of the disclosure provides a switched fabric authentication system that includes shared PCIe devices of a switched fabric. Each device associates at least one permitted requester identifier with a physical function of the device and instantiates a virtual function of the device based on the physical function. The virtual function includes the associated at least one requester identifier. Each device accepts memory-mapped input/output traffic through the virtual function only from a requester having a corresponding requester identifier matching a requester identifier associated with the virtual function. In addition to inheriting a permitted requester identifier from the physical function, the virtual function may stores other requester identifiers (e.g., in a register) associated specifically to that virtual function.

In some examples, the requester identifier includes a sender identifier of a peripheral component interconnect express transport level packet. Each device may include a physical function register storing the associated at least one requester identifier. In some implementations, each device includes an authoritative requester identifier field for each associated requester identifier of the physical function. Each authoritative requester identifier field has an associated set of enable bits. The set of enable bits may include at least one of a bus matching bit, a device matching bit, a function matching bit, or a filter function enablement bit. Each device may ignore the associated at least one requester identifier of the physical function when the bus matching bit is cleared. In some implementations, each device responds to memory-mapped input/output request packets having requester identifiers with a bus portion matching a corresponding bus portion of an associated requester identifier of the physical function when the bus matching bit is set. Additionally or alternatively, each device may respond to memory-mapped input/output request packets having requester identifiers with a bus portion and a device portion both matching a corresponding bus portion and a corresponding device portion of an associated requester identifier of the physical function when the bus matching bit and the device matching bit are both set. In some examples, the device responds to memory-mapped input/output request packets having requester identifiers with all bits matching corresponding bits of an associated requester identifier of the physical function when the bus matching bit, the device matching bit, and the function bit are each set.

Each device may instantiate the virtual function using the physical function as a template. The virtual function may be referenced only by a root complex or peer device designated by the requester identifier of the physical function when the bus matching bit is cleared. Moreover, the virtual function may respond to memory-mapped input/output request packets having requester identifiers with a bus portion matching a corresponding bus portion of an associated requester identifier of the virtual function when the bus matching bit is set. Additionally or alternatively, the virtual function may respond to memory-mapped input/output request packets having requester identifiers with a bus portion and a device portion both matching a corresponding bus portion and a corresponding device portion of an associated requester identifier of the virtual function when the bus matching bit and the device matching bit are both set. In some examples, the virtual function responds to memory-mapped input/output request packets having requester identifiers with all bits matching corresponding bits of an associated requester identifier of the virtual function when the bus matching bit, the device matching bit, and the function bit are each set.

Each device may include an authenticator configured to allow a write operation of the virtual function only to an address residing within an allowable address range associated with the device. Each virtual function may be configured to associate one or more allowable address ranges of the device. Moreover, each virtual function may be configured to associate an address base and an address length for the one or more allowable address ranges. In some examples, the method includes associating an address limit, such as an address length or a maximum address.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
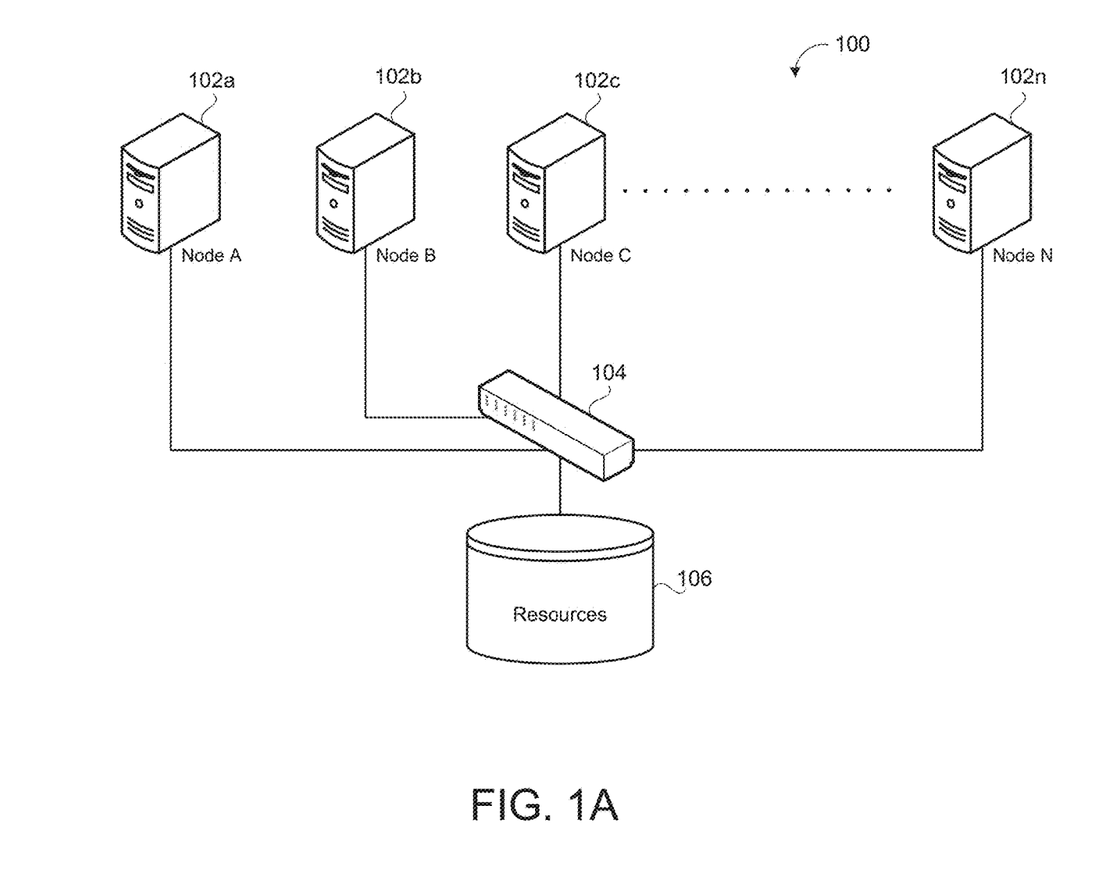
FIGS. 1A and 1B are schematic views of exemplary switched fabrics.

Referring to FIG. 1A, in some implementations, a switched fabric 100 (also referred to as a switching fabric or fabric) is a network topology where network nodes 102a-n connect with each other via one or more network switches 104 (e.g., via crossbar switches). The network nodes 102a-n may be clients connecting to storage resources 106 as well. Moreover, a switching fabric 100 is a combination of hardware and software that moves data coming in to a network node 102a-n out by a correct port to another network node 102a-n. The switching fabric 100 may include switching units in a network node 102a-n, integrated circuits, and programming stored non-transiently thereon that allows control of switching paths. The switching fabric 100 may be independent of the bus technology and infrastructure used to move data between nodes 102a-n and also separate from a router.

Figure 1B:
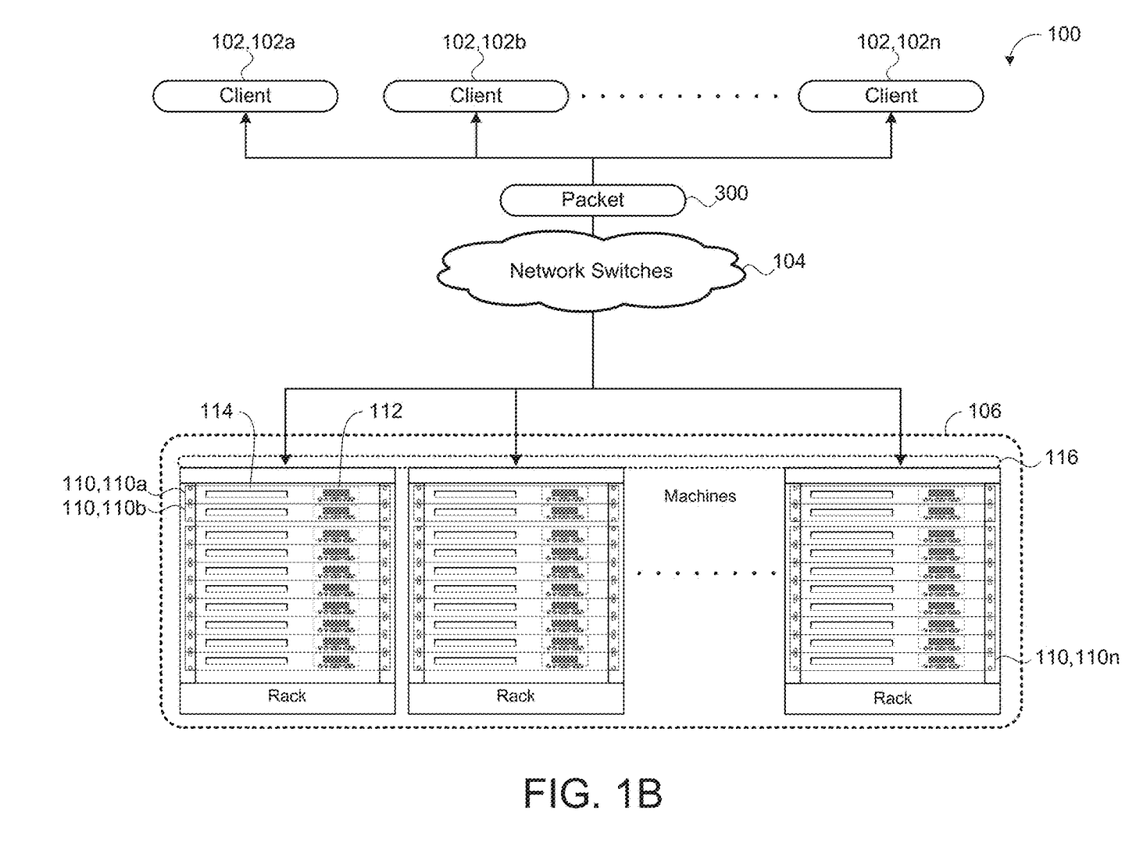

Referring to FIG. 1B, in some implementations, the resources 106 are a cluster of machines 110 (e.g., memory hosts, computing processors, computers, etc.). The cluster 106 may implement a distributed system that includes loosely coupled machines 110, 110a-n (e.g., computers or servers implemented as memory hosts or processors), each having a computing resource 112 (e.g., one or more processors) in communication with storage resources 114 (e.g., non-transitory memory, flash memory, dynamic random access memory (DRAM), phase change memory (PCM), and/or disks). The distributed system may include a storage abstraction 116 (e.g., key/value store or file system) overlain on the storage resources 114 allows scalable use of the storage resources 114 by one or more clients 102, 102-n. A client/server model allows a client 102 to request a service from a machine 110, also referred to herein as a device 110. A device 110 may use the switched fabric 100, such as PCI Express, instead of a bus for relatively enhanced performance.

Figure 2:
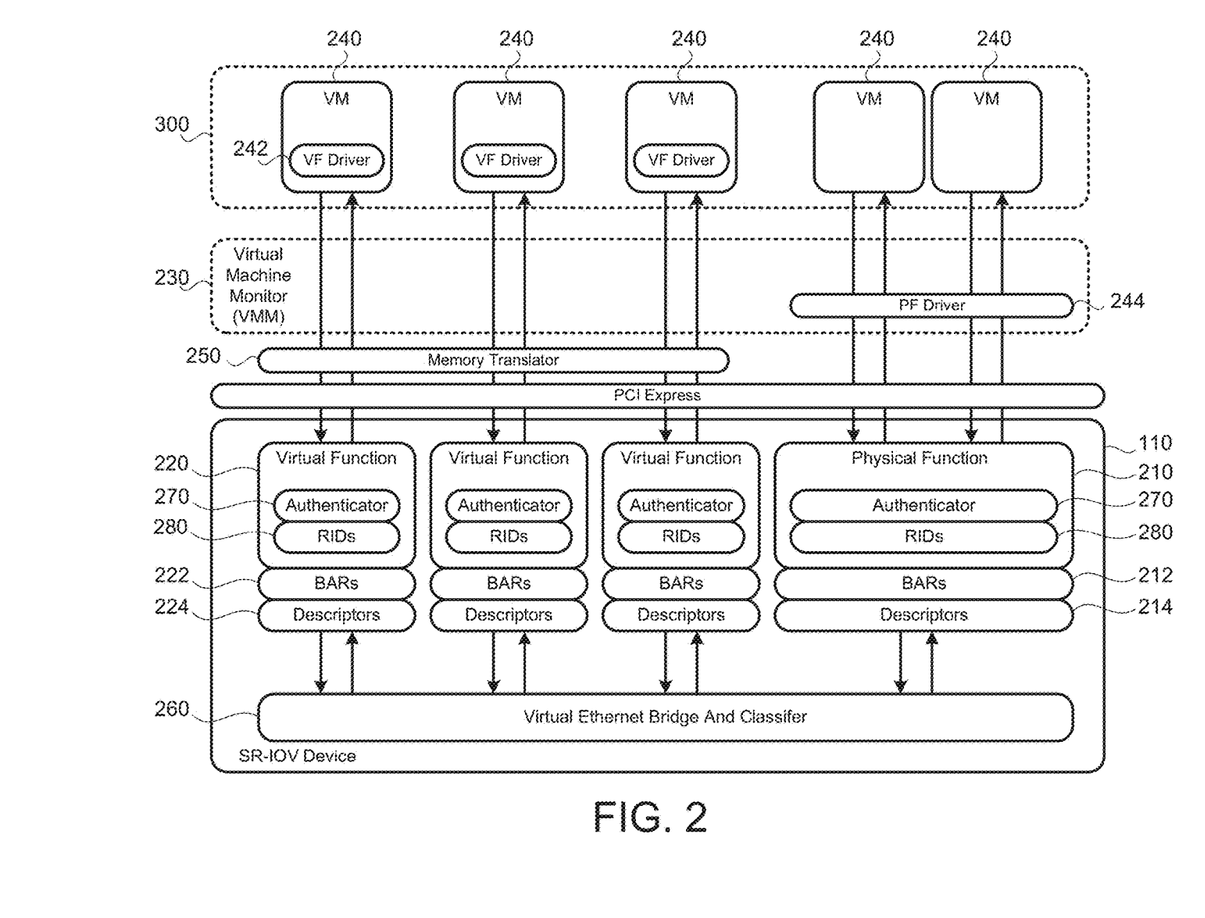
FIG. 2 is a schematic view of exemplary shared peripheral component interconnect express device interactions.

Referring to FIG. 2, in some implementations, a natively shared device 110 includes Single Root I/O Virtualization (SR-IOV), which is a peripheral component interconnect (PCI) feature which allows creation of virtual functions 220 (VF) that share the resources of a physical function (PF) 210. In other words, SR-IOV allows a PCIe device 110 to appear to be multiple separate physical PCIe devices 110a-n. Physical functions 210 are full-featured PCIe functions (e.g., an Ethernet port); whereas virtual functions 220 are lightweight functions that lack configuration resources, but can transmit and receive data. Physical functions 210 have full configuration resources, meaning that it's possible to configure or control the PCIe device 110 via the physical function 210, and the physical function 210 has full ability to move data in and out of the device 110. Virtual functions 220 are similar to physical functions 210, but lack configuration resources; basically, they only have the ability to move data in and out. Virtual functions 220 are non-configurable, because that would change the underlying physical function 210 and thus all other virtual functions 220. Configuration can only be done against the physical function 210. As with physical functions 210, each virtual function 220 may have a queue for handling requests. An operating system (OS) or hypervisor instance receives support to detect and initialize physical functions 210 and virtual functions 220, since they are not full PCIe devices 110a-n and cannot be treated as such. A PCIe device 110 may present multiple instances of itself up to the operating system (OS) instance or hypervisor, such as a virtual machine monitor (VMM) 230. The number of virtual instances that can be presented depends upon the device 110. The OS instance or hypervisor 230 may assign virtual machines (VM) 240 to the hardware resources, such as the virtual functions 220. Each virtual machine 240 loads a virtual function driver 242 that points the virtual machine 240 to registers 222 where the corresponding virtual function 220 resides. The virtual function driver 242 may have direct hardware access to populate descriptors 224 of the virtual function 220, indicating address locations to copy data to and from memory owned by the virtual machine 240. The physical function 210 may have associated Base Address Registers 212 and descriptors 214 as well.

The VMM 230 assigns one or more virtual functions 220 to a virtual machine 240 by mapping the actual configuration space 510 (FIG. 5) of the virtual functions 220 to a configuration space 245 of the virtual machine 240. A memory translator 250 allows direct memory access (DMA) transfers to and from the virtual machine 240, thus bypassing the software switch in the VMM 230.

Figure 3:
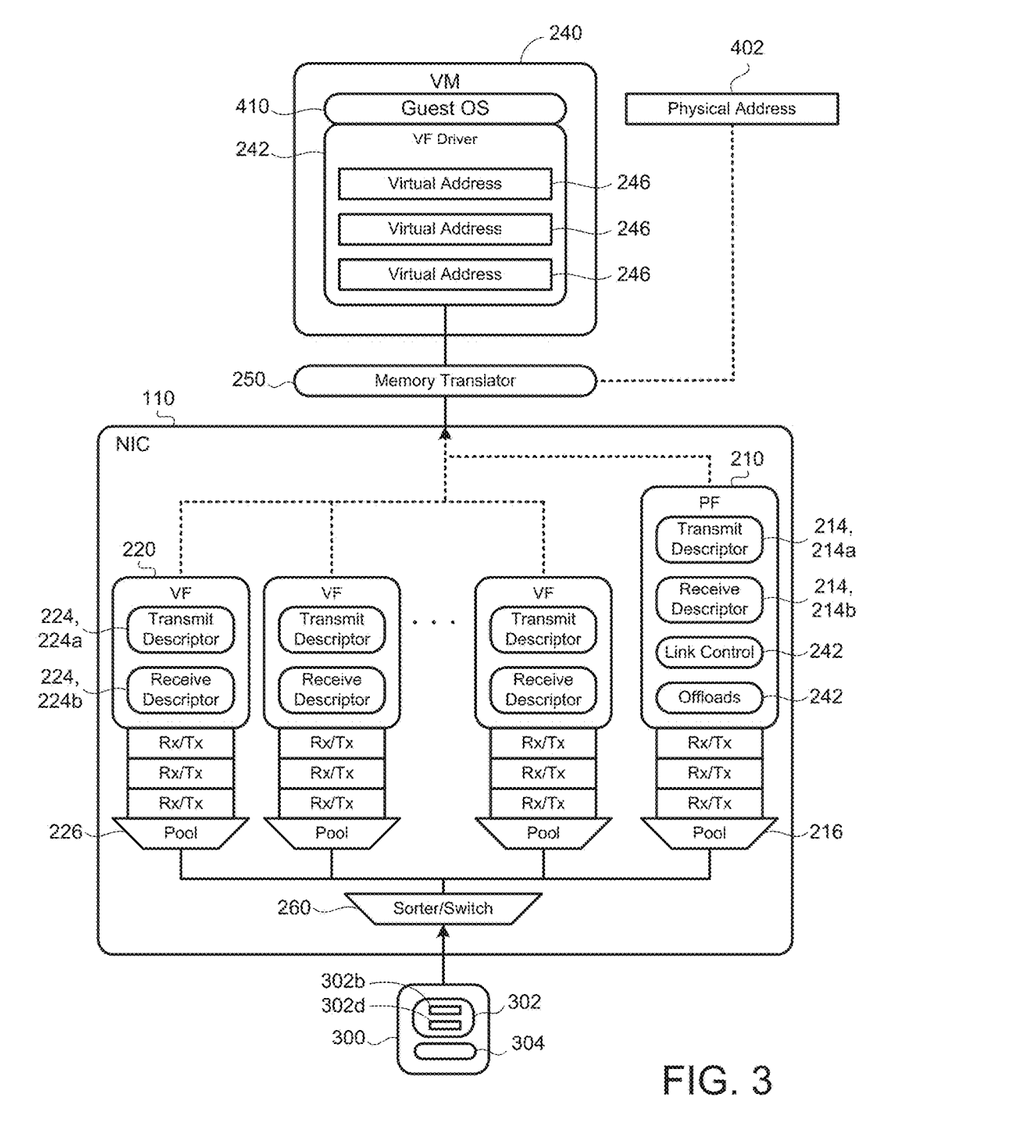
FIG. 3 is a schematic view of an exemplary shared peripheral component interconnect express device interacting with a virtual machine.

Referring to FIG. 3, in some implementations, a layer 2 sorter/switch 260 of a device 110, such as a network interface controller (NIC), receives a packet 300 (e.g., a PCIe packet) having a requester identifier (RID) 302 and data 304 and, based upon a MAC address or VLAN tag of the data packet 300, assigns the data packet 300 to a queue or pool 226 of a virtual function 220. The queue 226 may hold the data packet 300 in a first-in-first-out (FIFO) manner. When the data packet 300 reaches the head of the queue 226, the virtual function 220 writes the data 304 (e.g., via direct memory access (DMA)) to a guest physical address or virtual address 246 of a virtual machine 240 assigned to that virtual function 220, using the descriptors 224 (e.g., transmit descriptor 224a and receive descriptor 224b) populated by the virtual function driver 242 of the virtual machine 220. The memory translator 250 may re-route the data packet 300 from the virtual address 246 to a corresponding physical address 402 of a client 102 hosting the virtual machine 240, resulting in a DMA operation. Similarly, a physical function 210 may have a queue or pool 216 that receives data packets 300 for delivery to a physical address of the guest using descriptors 214 (e.g., transmit descriptor 214a and receive descriptor 214b) of the physical function 210.

Figure 4:
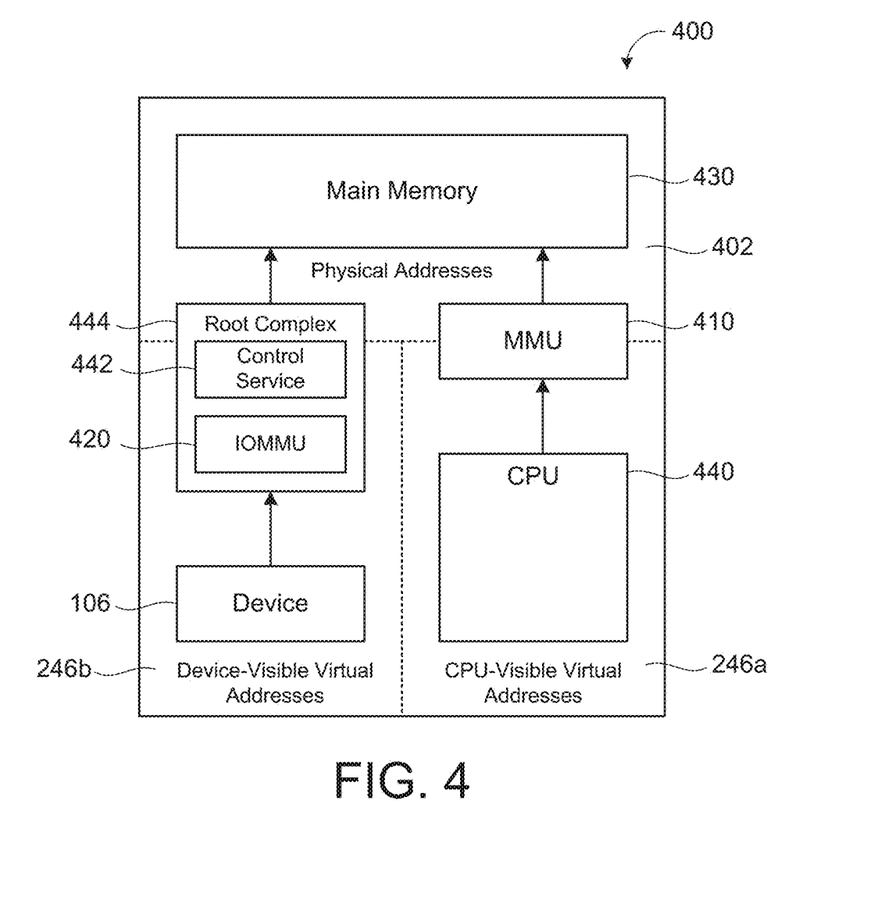
FIG. 4 is a schematic view of an exemplary device having an input/output memory management unit.

Referring to FIGS. 2-4, SR-IOV allows multiple virtual machines 240 on a single physical machine 400 to share a device 110, and assumes that the virtual machines 240 are protected from one another by a memory management unit (MMU) 410 under the control of a trusted virtual machine monitor (VMM) 230. Where that is the case, erroneous/unauthorized accesses to devices 110a-n or virtual functions 240 can be prevented at the originating end, by not allowing a memory map to a memory-mapped I/O page associated with the device 110 or virtual function 240. In a scheme that requires no such MMU 410, an authenticator 270 may ensure that devices 110a-n and virtual functions 240 accept commands only from designated peers 110a-n, 210, 220 (i.e., devices, virtual functions, or physical functions).

An input/output memory management unit (IOMMU) 420 is a memory management unit (MMU) 410 that connects a direct memory access (DMA)-capable I/O bus to main memory 430. Like a traditional MMU 410, which translates virtual addresses 246, 246a visible to a central processing unit (CPU) 440 to physical addresses 402, the IOMMU 420 takes care of mapping device-visible virtual addresses 246, 246b (also called device addresses or I/O addresses in this context) to physical addresses 402. The CPU 440 may include a root complex 444 (e.g., integrated therein) that connects the CPU 440 and memory 430 to the PCI Express switch fabric 100.

PCIe switches 104 and processor IOMMUs 420 can provide filtering and only allow designated devices 110a-n on the switch 104 to have access to memory 430 of a given computer 400, but fail to prevent unauthorized manipulation of a device virtual function 240 or "slice" by a compromised peer device 110 or system, so that a virtual function 240 with a legitimate right to DMA to/from the memory 430 of a first system is "hijacked" by a second system and used to access the first system.

In some implementations, each virtual function 240 or device slice includes a mapped-memory I/O (MMIO) state that acts as a filter, accepting PCI Express transactions that virtual function 240 (e.g., a device endpoint) is willing to accept for MMIO accesses across a PCI Express fabric 100. The MMIO state may be software visible as a PCI Express "capability." By enabling and configuring such a capability so that the virtual function 240 accepts MMIO traffic only from a first system, a PCIe device 110a-n may ignore, at a fundamental hardware level, any peer transactions from a second system, thwarting any attempt to compromise the first system via the virtual function 240. The MMIO state may provide a per-virtual function state level of isolation that is uniquely writable by a trusted control service 442. In some implementations, this trusted control service 442 is a head end (e.g., a control plane, such as a computer, controller, or field programmable gate array (FPGA), at the top of a switching fabric), but in other system architectures it may be a VMM 230 running on some node 102a-n.

Figure 5:
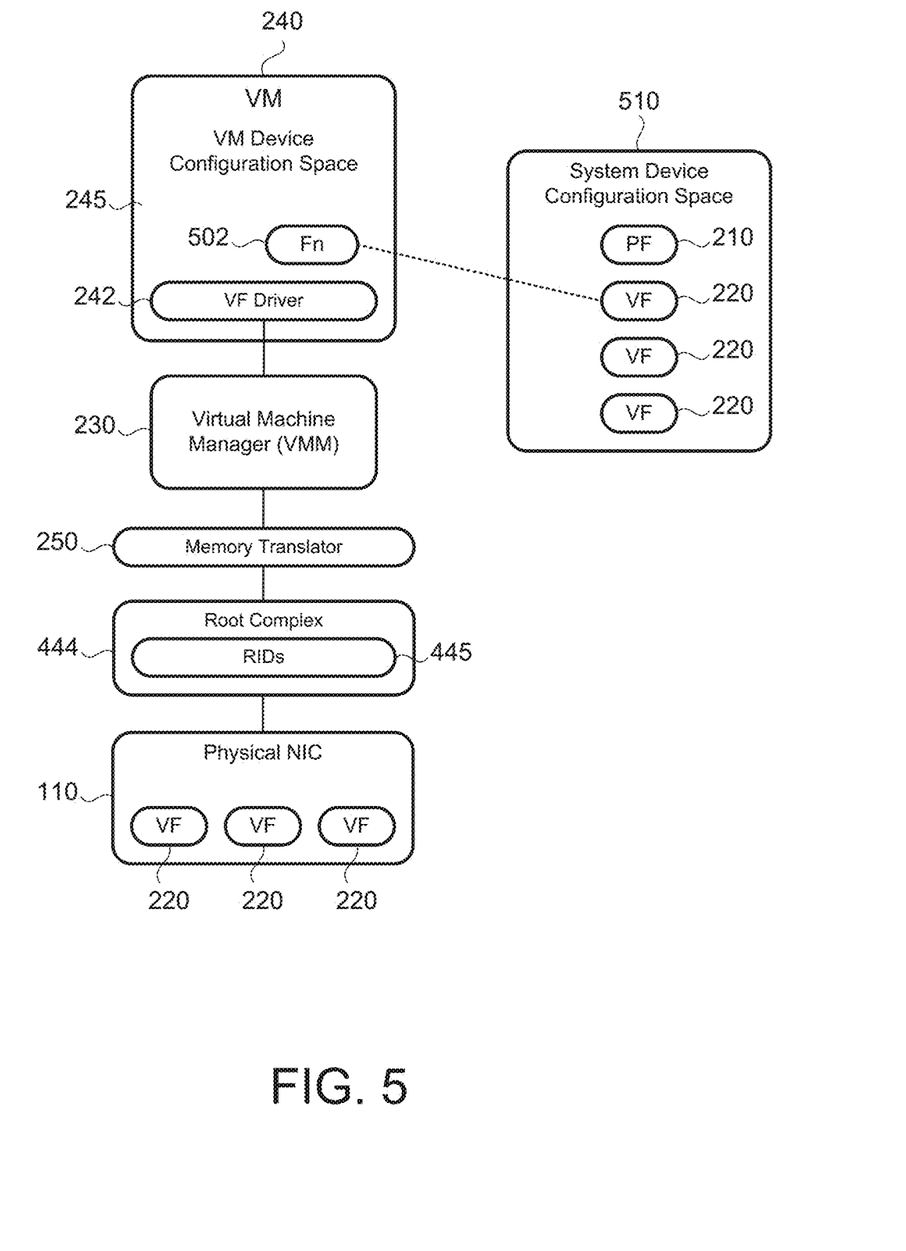
FIG. 5 is a schematic view of an exemplary shared peripheral component interconnect express device receiving a packet of data and writing the data to a virtual machine.
Figure 6:
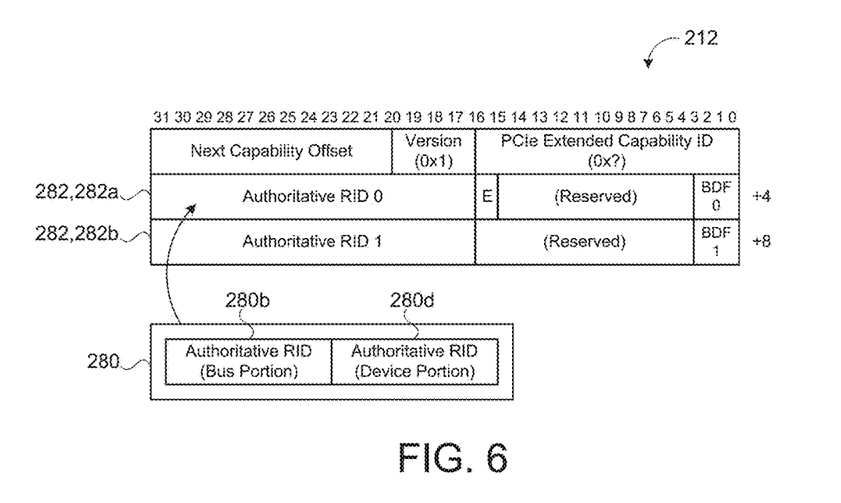
FIG. 6 is a schematic view of an exemplary physical function register scheme.
Figure 7:
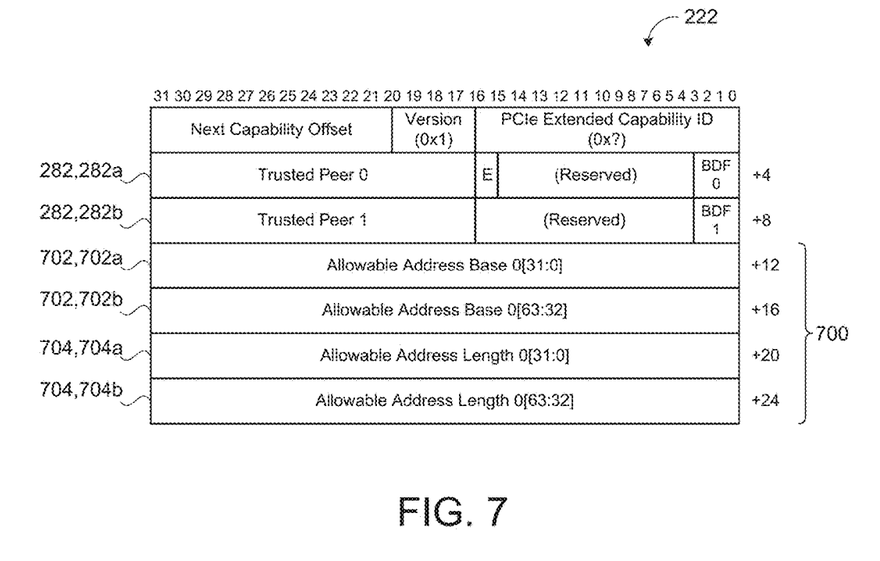
FIG. 7 is a schematic view of an exemplary virtual function register scheme.

Referring to FIGS. 5-7, the PCI Express SR-IOV specification generally does not provide for per-virtual function state in PCIe configuration space, since the number of architecturally allowed PCIe virtual functions 240 per device 110 is very large. A SR-IOV-capable device 110 can be configured (usually by the VMM 230) to appear in a PCI configuration space 510 as multiple functions 502, 210, 220, each with its own configuration space complete with Base Address Registers (BARs) 212, 222. The configuration space 510 contains physical function (PF) capability registers 212, also referred to as base address registers that provide a template for virtual function (VF) instantiation. Per-VF state is visible only in MMIO space. In order for a trusted control service 442 (FIG. 4) to have unique control of the per-VF access, the trusted control service 442 is granted that control via a secure mechanism, the authenticator 270. A per-physical function register 212, accessible in configuration space 510, defines bus/device IDs as authoritative IDs 280 to be regarded by all virtual functions 220 instantiated therefrom as authenticated and privileged. In addition to inheriting a permitted requester identifier 280 from the physical function 210, the virtual function 220 may store other requester identifiers 280 (e.g., in a register 222, 282) associated specifically to that virtual function 220.

The physical function (PF) capability registers 212 include authoritative requester identifier (RID) fields 282, 282a-b that contain a PCI Express Bus/Function/Device ID 280. Although two authoritative RID fields 282a-b are shown, more or fewer are possible. Moreover, the authenticator RID 282 may store a PCI segment number as well. Each Authoritative RID field 282 is associated with a set of enable bits: B for bus matching, D for device matching, and F for function matching. If the B bit is cleared, the Authoritative RID slot is ignored. If the B bit only is set, the device 110 will respond normally to MMIO request packets 300 whose RID 302 contains the Authoritative RID bus number 280, regardless of device and function codes. If the B and D bits are both set, the device 110 will respond normally to requests 300 whose requester ID 302 matches both the bus and the device encodings, regardless of the function encoding. If all three of the B, D, F bits are all set, the full 16 bits of the authoritative RID 280 must match the requester ID 302 of the incoming packet 300. Legacy PCIe behavior must be assured at reset. A software read/write (R/W) E bit, which has a reset value of zero, may enable an authoritative RID filter function.

At system initialization, a physical function driver 244 designates load/store requester IDs (RIDs) 445 of its root complex 444 as the authoritative RIDs 280 for the physical device 110. Accesses in MMIO space from this physical function-designated bus/device ID 445 are always respected, allowing the physical function driver 244 to program the per-virtual function capability registers 222 that enable virtual function access from peer devices 110. Each SR-IOV virtual function 220 has a distinct capability state that allows per-virtual function trusted peers 110 to be set up via the physical function driver 244.

The encoding for the virtual function 220 may be the same as for the physical function capability. If the B bit is cleared, the virtual function 220 can be referenced only by the root complex 444 designated by the Authoritative RIDs 280 of the physical function 210 (e.g., as in a classical VMM-based SR-IOV system). If a B bit is set, it designates a peer bus ID 302b, whose transaction layer packets (TLPs) 300 may also be accepted by the virtual function 220. If the D bit is also set, both a bus ID 302b and a device ID 302d of the requester ID 302 must match a corresponding bus ID 280b and a device ID 280d of the Trusted Peer/Authoritative ID 280 and if the all three bits are set, the full 16 bits of the requester ID 302 must match the Trusted Peer/Authoritative ID 280, which may be necessary to support peers 110 generating ARI requester IDs 302. As with the Authoritative RID capability, to preserve legacy behavior, a software read/write (R/W) E bit, which has a reset value of zero, may enable the Trusted Peer filter.

Request packets 300 with requester IDs (RIDs) 302 that do not match any Trusted Peer/Authoritative RID 280 may be treated similarly to those generating access control service (ACS) violations. For example, completions can be generated with Completer Abort status, and errors can be logged and signaled as target aborts. ACS can be used to prevent various forms of silent data corruption by preventing PCI Express Requests from being incorrectly routed to a peer Endpoint. For example, if the address within a Request header is silently corrupted within a PCI Express Switch (such as in a store-and-forward implementation), the transaction may be incorrectly routed to a downstream Endpoint or Root Port and acted upon it as though it were a valid transaction for that component. This could result in any number of problems which may or may not be able to be detected by the associated application or service.

As PCI Express capabilities, these could either be vendor-specific extensions, or, ideally, a generally recognized capability with a registered ID. Although the capability definitions given here are static, for simplicity, for more than two trusted peer endpoints per virtual function 220, it may be extensible to allow up to N RIDs 280 to be registered to be recognized by the virtual function 220, where the minimum value of N would be 2.

The scheme follows the spirit and form of the PCI Express base and SR-IOV specifications as closely as possible, avoiding per-virtual function state associated directly with the physical function 210. As a consequence, it creates software-visible artifacts in both the configuration space of the physical function 210 and the virtual function MMIO space. An alternative means of setting up the required per-virtual function access control lists includes extending the configuration space of the physical function 210 with a more complex mechanism to allow control without requiring per-virtual function MMIO instantiation, e.g. a cursor-based mechanism residing solely in the configuration space of the physical function 210.

PCI Express does allow for traffic arriving at a port to be forwarded for verification to a single "root complex" 444 on a given PCIe tree. A protection scheme combining of this capability with that of an I/O memory management unit (IOMMU) 420 on the root complex 444 may ensure that devices 110 and virtual functions 220 accept commands only from designated peers 110, 210, 220.

Using an address filter alone to associate trusted peers 110, 210, 220 with each virtual function 220 of a device 110 may rely on client machines 102a-n in the PCIe fabric 100 to protect themselves, for example, using IOMMUs 420 and/or address filters, such as a RID look-up table (LUT). A trusted peer 110, 210, 220 of a virtual function 220; however, may program any global system address (whether or not it is owned by the trusted peer) into that virtual function 220 and may generate transactions to those addresses. To prevent a trusted peer 110, 210, 220 from targeting the address space of another peer 110, 210, 220, a mechanism in control of the switch fabric 100 (e.g., the authenticator 270) may control traffic thereon in both directions, without trusting peers 110, 210, 220 to configure their own protection properly.

Referring to FIG. 7, in some implementations, each virtual function 220 includes an address register 222 that includes allowable address registers 700. In some examples, the allowable address fields 700 include a base address field 702, 702a-b (e.g., containing a 64 bit base) and an address length field 704, 704a-b (e.g., containing a 64 bit length). The authenticator 270 checks the address 246, 402 of any outbound memory transaction from the virtual function 220 against the allowable address registers 700 and aborts the transaction (without sending the transaction upstream) if the address 246, 402 does not match any address 246, 402 stored by the address registers 700 or is not within a range of addresses stored by the address registers 700. Since PCI read and write transactions are address routed, the base and length registers 702, 704 are not duplicated per trusted peer, which is a device ID 280, but rather per virtual function 220 on the device 110. In implementations where the trusted peer registers 222 are implemented in a filter chip, the target abort for an illegal access may be sent from the filter chip itself. In implementations where the trusted peer registers 222 are implemented in the device 110, the abort behavior may remain internal to the device 110, but may provide the same error behavior as a filter chip. Implementing the filtering behavior in devices 110 allows the implementation cost to scale with the number of devices 110 in the system rather than burdening the switch chip or adding filter chips per physical device 110.

The authenticator 270 filters PCIe transactions from client computers 102a-n to device virtual functions 220 using the Trusted Peer/Authoritative RID registers 280. A client 102a-n not on a virtual function's Trusted Peer list (i.e., does not have a RID 302 matching the trusted peer/authoritative RID 280) cannot read or write to the virtual function 220. PCIe transactions from device virtual functions 220 are filtered by the Allowed Address registers 700. A device virtual function 220 may not write outside the allowed address ranges 700, 702, 704 for that device 110. A system configuration agent identified in the Authoritative RID fields 282 may set the allowed address registers 700 to encompass only the assigned memory space of that client 110. To allow devices 110 to match PCIe behavior in a backward compatible fashion, the allowed address register functionality may default to disabled for each virtual function, and uses an enable bit in offset +4 for each virtual function, for example. In some implementations, it is assumed that a client's memory space is contiguous in the global address space, and thus a single allowed address range 700, 702, 704 per virtual function is sufficient. Additionally or alternatively, the allowed address register 700 may accept multiple allowed address ranges per virtual function, for example, when the client memory space is discontiguous. Since storage of bits per virtual functions 220 can be somewhat expensive, the allow address register 700 may store bits 63:12 of the allowed address base in an allowable address base field 702, and store a length as an offset logarithm base 2 value in bits 5:0 of an address length field 704. For example, length=0 indicates that the Allowed Address range check is disabled; length=1 indicates a length of 4 KB; and length=2 indicates a length of 8 KB, and so on.

Figure 8:
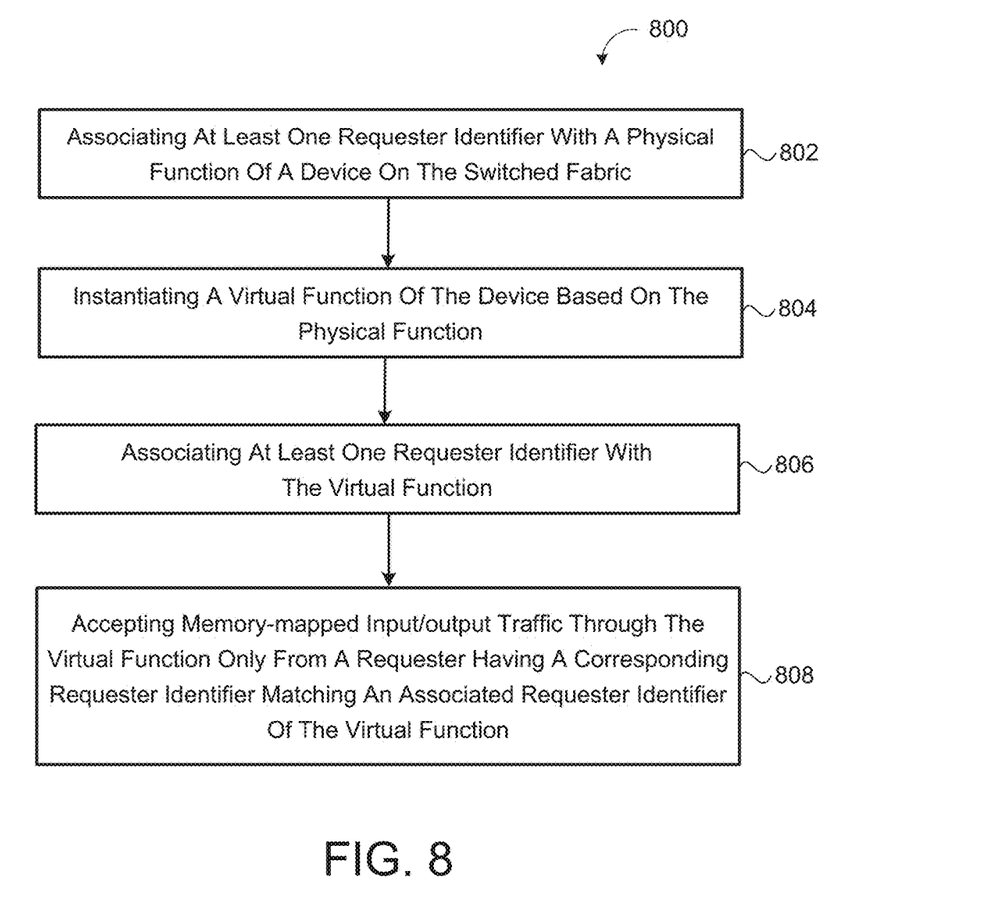
FIG. 8 is a schematic view of an exemplary arrangement of operations for a method of authenticating shared peripheral component interconnect express devices of a switched fabric.

FIG. 8 illustrates an exemplary arrangement of operations for a method 800 of authenticating shared PCI Express devices 110a-n of a switched fabric 100. The method 800 includes associating 802 at least one permitted requester identifier 280 with a physical function 210 of a device 110 on the switched fabric 100 and instantiating 804 a virtual function 220 of the device 110 based on the physical function 210. The method may include associating 806 the at least one permitted requester identifier 280 with the virtual function 220. Therefore, the virtual function 220 includes the associated at least one permitted requester identifier 280. The method 800 further includes accepting 808 memory-mapped input/output traffic through the virtual function 220 only from a requester 102 having a corresponding requester identifier 302 matching an associated permitted requester identifier 280 of the virtual function 220. The method, in some implementations, includes associating other permitted requester identifier(s) 280 with the virtual function 220 (e.g., storing the other requester identifiers 280 in a register 282). The other associated requester identifier(s) 280 may be specific to that virtual function 220.

In some implementations, the requester identifier 280 includes a sender identifier 302, 302b, 302d of a PCIe transport level packet 300. The method may include defining a physical function register 212 to store the associated at least one permitted requester identifier 280. Moreover, the method may include defining an authoritative requester identifier field 282 for each instantiated virtual function 220 of the physical function 210 and associating a set of enable bits with each virtual function's authoritative requester identifier field 282. The set of enable bits may include at least one of a bus matching bit B, a device matching bit D, a function matching bit F, or a filter function enable bit E. In some implementations, multiple enable bits per bus, device, or function may be instantiated to form a mask of bus, device, and function bits to be checked against the requester identifier.

The device 110 may ignore the associated at least one requester identifier 280 of the physical function 210 when bus matching is cleared, e.g., when the bus matching bit(s) B is cleared. In some examples, the device 110 responds to memory-mapped input/output request packets 300 having requester identifiers 302 with a bus portion 302b matching a corresponding bus portion 280b of an associated requester identifier 280 (the authoritative RID) of the physical function 210 when the bus matching bit B is set. Additionally or alternatively, the device 110 may respond to memory-mapped input/output request packets 300 having requester identifiers 302 with a bus portion 302b and a device portion 302d both matching a corresponding bus portion 280b and a corresponding device portion 280d of a requester identifier 280 (the authoritative RID) associated with the physical function 210 when the bus matching bit B and the device matching bit D are both set. In some examples, the device 110 responds to memory-mapped input/output request packets 300 having requester identifiers 302 with all bits matching corresponding bits of a requester identifier 280 (the authoritative RID) associated with the physical function 210 when the bus matching bit B, the device matching bit D, and the function bit F are each set.

In some implementations, the method includes instantiating the virtual function 220 with the same set of enable bits as the physical function 210. The virtual function 220 may be referenced only by a root complex 444 or peer device 110 designated by the permitted requester identifier 280 of the physical function 210 when the bus matching bit B of the virtual function 220 is cleared. The virtual function 220 may respond to memory-mapped input/output request packets 300 having requester identifiers 302 with a bus portion 302b matching a corresponding bus portion 280b of an associated requester identifier 280 (the authoritative RID) of the virtual function 220 when the bus matching bit B is set. Additionally or alternatively, the virtual function 220 may respond to memory-mapped input/output request packets 300 having requester identifiers 302 with a bus portion 302b and a device portion 302d both matching a corresponding bus portion 280b and a corresponding device portion 280d of an associated requester identifier 280 (the authoritative RID) of the virtual function 220 when the bus matching bit B and the device matching bit D are both set. In some examples, the virtual function 220 responds to memory-mapped input/output request packets 300 having requester identifiers 302 with all bits matching corresponding bits of an associated requester identifier 280 (the authoritative RID) of the virtual function 220 when the bus matching bit B, the device matching bit D, and the function bit F are each set.

The method may include allowing a write operation of the virtual function 220 only to an address residing within an allowable address range 700, 702, 704 associated with the device 110. In some examples, the method includes associating one or more allowable address ranges 700, 702, 704 of the device 110 to each virtual function 220. The method may also include associating an address base 702 and an address length 704 for the one or more allowable address ranges 700, 702, 704.

Although various implementations are described with respect to Single Root I/O Virtualization (SR-IOV), these implementations may be applied to other I/O virtualization schemes, including and not limited to Multi-Root I/O Virtualization (MR-IOV) and single-function devices.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user device in response to requests received from the web browser.

One or more aspects of the disclosure can be implemented in a computing system that includes a backend component, e.g., as a data server, or that includes a middleware component, e.g., an application server, or that includes a frontend component, e.g., a computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of authenticating access to shared peripheral devices on a switched interconnection fabric, the method comprising:
    associating at least one permitted requester identifier with a physical function of a device on the switched fabric;
    instantiating a virtual function of the device based on the physical function, the virtual function inheriting the associated at least one permitted requester identifier;
    receiving a memory-mapped input/output (MMIO) request at the virtual function;
    comparing, at the virtual function, a requester identifier of the MMIO request with the at least one permitted requester identifier of the virtual function;
    if the requester identifier of the MMIO request matches the at least one permitted requester identifier of the virtual function:
        accepting, by the virtual function, the MMIO request, and
        allowing, by the virtual function, the accepted MMIO request to access a memory address space allocated to a host corresponding to the request identifier; and
    if the request identifier of the MMIO request does not match the at least one permitted requester identifier of the virtual function, denying, by the virtual function, access to the memory address space to the MMIO request.

2. The method of claim 1, wherein the requester identifier comprises a sender identifier of a Peripheral Component Interconnect Express transport level packet.

3. The method of claim 1, further comprising defining a physical function register to store the associated at least one permitted requester identifier.

4. The method of claim 3, further comprising:
    defining an authoritative requester identifier field for each instantiated virtual function of the physical function; and
    associating a set of enable bits with each authoritative requester identifier field.

5. The method of claim 4, wherein the set of enable bits comprise at least one of a bus matching bit, a device matching bit, a function matching bit, or a filter function enable bit.

6. The method of claim 5, wherein the device ignores the associated at least one requester identifier of the physical function when bus matching is cleared.

7. The method of claim 5, wherein the device responds to memory-mapped input/output request packets having requester identifiers with a bus portion matching a corresponding bus portion of an associated requester identifier of the physical function when the bus matching bit is set.

8. The method of claim 5, wherein the device responds to memory-mapped input/output request packets having requester identifiers with a bus portion and a device portion both matching a corresponding bus portion and a corresponding device portion of a requester identifier associated with the physical function when the bus matching bit and the device matching bit are both set.

9. The method of claim 5, wherein the device responds to memory-mapped input/output request packets having requester identifiers with all bits matching corresponding bits of a requester identifier associated with the physical function when the bus matching bit, the device matching bit, and the function bit are each set.

10. The method of claim 5, further comprising instantiating the virtual function with the same set of enable bits as the physical function.

11. The method of claim 10, wherein the virtual function can be referenced only by a root complex or peer device designated by the requester identifier associated with the physical function when the bus matching bit of the virtual function is cleared.

12. The method of claim 10, wherein the virtual function responds to memory-mapped input/output request packets having requester identifiers with a bus portion matching a corresponding bus portion of an associated requester identifier of the virtual function when the bus matching bit is set.

13. The method of claim 10, wherein the virtual function responds to memory-mapped input/output request packets having requester identifiers with a bus portion and a device portion both matching a corresponding bus portion and a corresponding device portion of an associated requester identifier of the virtual function when the bus matching bit and the device matching bit are both set.

14. The method of claim 10, wherein the virtual function responds to memory-mapped input/output request packets having requester identifiers with all bits matching corresponding bits of an associated requester identifier of the virtual function when the bus matching bit, the device matching bit, and the function bit are each set.

15. The method of claim 1, further comprising allowing a write operation of the virtual function or the physical function only to an address residing within an allowable address range associated with the device.

16. The method of claim 15, further comprising associating one or more allowable address ranges of the device to each virtual function.

17. The method of claim 16, further comprising associating an address base and an address length for the one or more allowable address ranges.

18. A switched fabric authentication system comprising:
shared peripheral interconnection network devices of a switched fabric, each device configured to:
associate at least one permitted requester identifier with a physical function of the device;
instantiate a virtual function of the device based on the physical function, the virtual function including the associated at least one requester identifier;
receive a memory-mapped input/output (MMIO) request at the virtual function;
compare, at the virtual function, a requester identifier of the MMIO request with the at least one permitted requester identifier of the virtual function;
if the requester identifier of the MMIO traffic matches the at least one permitted requester identifier of the virtual function:
accept, by the virtual function, the MMIO request, and allow, by the virtual function, the accepted MMIO request to access a memory address space allocated to a host corresponding to the request identifier; and
if the request identifier of the MMIO request odes not match the at least one permitted requester identifier of the virtual function, deny, by the virtual function, access to the memory address space to the MMIO request.

19. The switched fabric authentication system of claim 18, wherein the requester identifier comprises a sender identifier of a peripheral component interconnect express transport level packet.

20. The switched fabric authentication system of claim 18, wherein each device includes a physical function register storing the associated at least one requester identifier.

21. The switched fabric authentication system of claim 20, wherein each device includes an authoritative requester identifier field for each associated requester identifier of the physical function, each authoritative requester identifier field having an associated set of enable bits.

22. The switched fabric authentication system of claim 21, wherein the set of enable bits comprise at least one of a bus matching bit, a device matching bit, a function matching bit, or a filter function enablement bit.

23. The switched fabric authentication system of claim 22, wherein each device ignores the associated at least one requester identifier of the physical function when the bus matching bit is cleared.

24. The switched fabric authentication system of claim 22, wherein each device responds to memory-mapped input/output request packets having requester identifiers with a bus portion matching a corresponding bus portion of an associated requester identifier of the physical function when the bus matching bit is set.

25. The switched fabric authentication system of claim 22, wherein each device responds to memory-mapped input/output request packets having requester identifiers with a bus portion and a device portion both matching a corresponding bus portion and a corresponding device portion of an associated requester identifier of the physical function when the bus matching bit and the device matching bit are both set.

26. The switched fabric authentication system of claim 22, wherein the device responds to memory-mapped input/output request packets having requester identifiers with all bits matching corresponding bits of an associated requester identifier of the physical function when the bus matching bit, the device matching bit, and the function bit are each set.

27. The switched fabric authentication system of claim 22, wherein each device instantiates the virtual function using the physical function as a template.

28. The switched fabric authentication system of claim 27, wherein the virtual function can be referenced only by a root complex or peer device designated by the requester identifier associated with the physical function when the bus matching bit is cleared.

29. The switched fabric authentication system of claim 27, wherein the virtual function responds to memory-mapped input/output request packets having requester identifiers with a bus portion matching a corresponding bus portion of an associated requester identifier of the virtual function when the bus matching bit is set.

30. The switched fabric authentication system of claim 27, wherein the virtual function responds to memory-mapped input/output request packets having requester identifiers with a bus portion and a device portion both matching a corresponding bus portion and a corresponding device portion of an associated requester identifier of the virtual function when the bus matching bit and the device matching bit are both set.

31. The switched fabric authentication system of claim 27, wherein the virtual function responds to memory-mapped input/output request packets having requester identifiers with all bits matching corresponding bits of an associated requester identifier of the virtual function when the bus matching bit, the device matching bit, and the function bit are each set.

32. The switched fabric authentication system of claim 18, wherein each device comprise an authenticator configured to allow a write operation of the virtual function only to an address residing within an allowable address range associated with the device.

33. The switched fabric authentication system of claim 32, wherein each virtual function is configured to associate one or more allowable address ranges of the device.

34. The switched fabric authentication system of claim 33, wherein each virtual function is configured to associate an address base and an address length for the one or more allowable address ranges.

\* \* \* \* \*